Feb. 5, 1957  C. S. BROWN  2,780,482
EXPANSION JOINT FOR PIPE LINES AND THE LIKE

Filed March 5, 1953

INVENTOR.
CARL S. BROWN
BY
Bates, Teare, y McBean
ATTORNEYS

2,780,482

EXPANSION JOINT FOR PIPE LINES AND THE LIKE

Carl S. Brown, Lakewood, Ohio, assignor to Glascote Products, Inc., Cleveland, Ohio, a corporation of Ohio Application March 5, 1953, Serial No. 340,543

2 Claims. (Cl. 285—41)

This invention is concerned with improvements in or relating to expansion joints for pipe lines and the like. The invention is especially concerned with improvements in or relating to expansion joints for metallic pipe lines or conduits which are used to conduct corrosive material from one place to another and particularly wherein it is desirable to coat the inner surface of the conduit and the expansion joint with a vitreous enameled coating to protect such surfaces from the corrosion action of the material being conducted. These, therefore, are the general objects of the present invention.

In the past, expansion joints have been provided for pipe lines and the like in which the end of one length or section of metal pipe is enlarged so that it may be telescopically positioned relative to the end of the adjacent section, the joint between the two overlapping sections being made fluid tight by a packing material which generally encircles the inner section and is held in place between the telescoping sections by a packing gland or the like. Such construction permits axial movement between the two sections to provide for axial expansion of the pipe line under varying climatic or temperature conditions. When such expansion joints are used with highly corrosive fluids, it becomes necessary to coat the internal metallic surfaces of both the pipe sections and the expansion joint with a corrosive resistant material.

One highly efficient protective coating for such metallic pipe surfaces, which will protect them from either alkaline or acid corrosive fluids, comprises a vitreous enamel which forms a glass like coating on the surfaces to be protected when fused thereto. Various compositions are known at the present time which may be applied to the metallic surfaces to be protected and fused thereto by the application of heat. Generally such compositions include a fine powdered frit which is mixed with water so that a thin coating may be applied to the metal surfaces to be protected. Such coating is permitted to dry, following which the entire article is placed in an oven or furnace and the coating fused to the metallic surfaces by firing at the usual temperature, generally from twelve hundred to two thousand degrees Fahrenheit.

Those skilled in the vitreous enameling art are aware that it is extremely difficult to provide a protective vitreous enamel coating which will eliminate the presence of "fish scale." This is an enamel defect which appears as a scattered chipping of the enamel from the surface to which it was fused, and which resembles fish scales. Such defect seriously affects the corrosive resistant qualities of the enamel coating, and various theories have been advanced concerning the cause thereof. Much attention has been given to the provision of an enameling frit or slip, the use of which would reduce such defects and minimize their effect. While such efforts have met with some success they have not eliminated the defect above pointed out.

I have found that the defects are increased in those instances where the protective enamel coating is applied to both the inner and outer surfaces of the metallic article, and particularly in instances where the coating is applied to the inner and outer surfaces of a comparatively thin walled metal tube or the like. Under such conditions these defects have created a disadvantage of such magnitude that they rendered it impractical to coat the exposed surfaces of expansion joints of the type heretofore mentioned.

I believe that these defects are caused in part by gases formed in the metal during the firing or during the subsequent cooling process, the escape of which gases either is prevented by the enamel coating thus causing the lack of adherence, or results in chips in such coating called fish scale. This belief is strengthened by the fact that when both the inner and outer surfaces of thin-walled metal pipe or tubes are coated, the defects above pointed out are greatly increased over those which occur when but one surface of the material is coated.

To overcome the above-mentioned disadvantages the present invention contemplates the provision of an expansion joint of the telescopic type, heretofore mentioned, in which it will be unnecessary to coat the inner and outer surface of any one metallic wall.

Other advantages and objects of the present invention will become more apparent from the following description of an embodiment thereof illustrated in the accompanying drawings. The essential features of the invention will be summarized in the claims.

Figure 1:
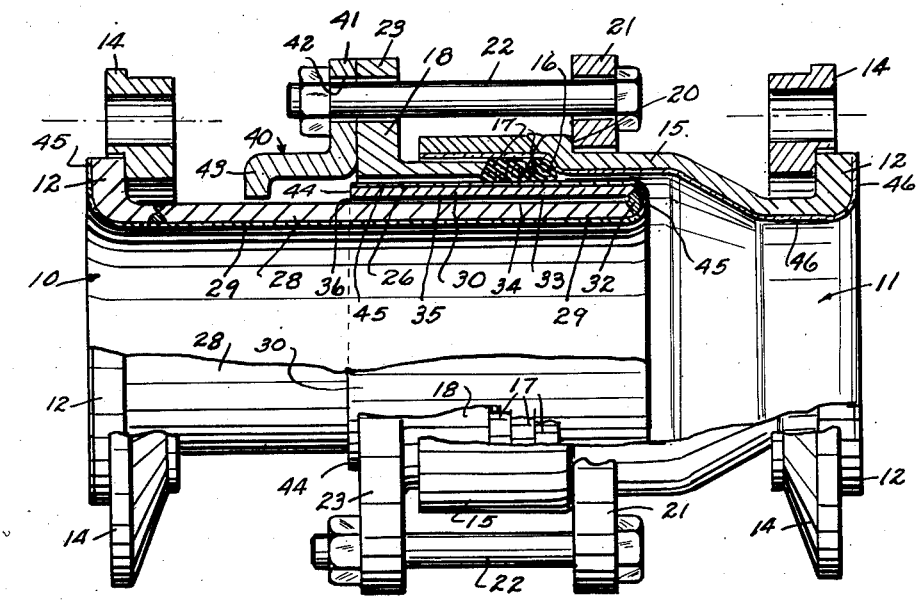
Fig. 1 is an elevational view of an expansion joint constructed in accord with the present invention, the upper section of the joint being broken away, illustrating a cross sectional view taken along the longitudinal center line of the joint.
Figure 2:
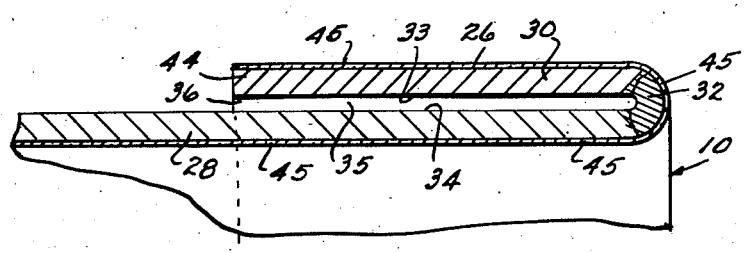
Fig. 2 is a fragmentary sectional detail of one member of the improved telescopic joint.

Referring now to the drawings in detail, it will be seen that the improved expansion joint comprises a pair of tubular or pipe-like members 10 and 11. The left hand end 15 of the member 11 has an internal diameter somewhat larger than the external diameter of the adjacent end of the member 10 and is telescopically arranged relative thereto. The remote ends of the tubular members 10 and 11 are each illustrated as being provided with a flange 12 against which a split ring coupling member 14 may seat to facilitate the securing of the ends of the tubular members 10 and 11 to other tubes or conduits of a pipe line or the like. As various types of split ring coupling members are well known in the art at the present time, the members 14 are more or less diagrammatically illustrated and described herein.

As illustrated the enlarged portion 15 of the member 11 is provided with an internal seat 16 against which one or more packing rings 17 of a corrosive resistant material may be placed and held in position by a packing gland 18. The external surface of the member 11 is provided with a shoulder 20 against which a ring 21 may seat. This ring has openings to receive bolts 22 which pass through similar openings formed in a flange 23 of the packing gland to retain the packing in position and to provide a fluid-tight joint between the members 10 and 11 as is customary in the art at the present time.

As heretofore mentioned this invention is particularly concerned with the provision of an expansion joint, the exposed internal surfaces of which may be provided with a corrosion resistant vitreous enameled coating. The invention provides a structure in which the internal member 10 may have its internal surface and the portion of its external surface which coacts with the packing 17 without increasing the enamel defects as heretofore described. To this end the member 10 comprises a tube 28 and an encircling sleeve 30, the latter providing the external surface 26 of the tubular member 10 which coacts with the packing 17. The internal diameter of the sleeve 30 is greater than the external diameter of the telescoping or right hand end of the tube 28. The inner or right ends of the tube 28 and the sleeve 30 lie in substantially the same radial plane and are secured thereto by a weld 32 which bridges the gap between the sleeve 30 and the tube 28, at the right hand end of the member 10 and maintains the inner wall 33 of the sleeve spaced from the outer wall 34 of the tube 28 throughout its entire extent. At its left hand end the space 35 between the tube 28 and the sleeve 30 is left open. Thus a section through the wall of the telescoping end of the tubular member 10 is J shaped in cross section. This enables an efficient application of the vitreous enamel to the inner surface 29 and the outer surface 26 of the tubular member 10. As illustrated in the drawing the enamel coating 45 extends continuously along the entire length of the internal surface 29 of the tube 28, around the external wall of the weld 32, and covers the external surface 26 of the sleeve 30. Thus during the enameling operation, the coating is applied to surfaces of the tubular member 10 in such manner so that an uncoated exposed surface lies opposite thereto. A similar enamel coating 46 is applied to the inner surface of the tubular member 11.

Inasmuch as there is only one surface of the tube 28 and the sleeve 30 coated, any gases liberated from the metal parts 28 and 30 during the firing of the enamel may pass from the uncoated surfaces 33 and 34 of the pipe 28 and sleeve 30 and enter the gap 35 without passing through the enamel coating being fused therethrough, and may escape through the open outer end 36 of the gap 35. The result is a vitreous enamel having a high degree of adherence to the metal surfaces to which it was applied and which is substantially devoid of undesired "fish scale."

To prevent excessive axial movement between the members 10 and 11, one or more safety locks 40 are provided. One of these locks is shown in Fig. 1 as comprising a Z shape member, one leg 41 of which is provided with an opening 42 to receive one of the bolts 22 which retain the packing gland 18 in position. The lock is secured in position by the bolt 22 so that the other leg 43 thereof extends toward the outer surface of the tube 28 and lies in the path of the sleeve 30. It will be noted that the exposed end 44 of the sleeve 30 is an uncoated metallic surface, accordingly contact between the sleeve and the safety lock will not disturb the enamel coating.

I claim:

1. A corrosion resistant expansion joint for pipe lines or the like, comprising a pair of elongated metallic tubular members, one end of one member being telescopically disposed inside the other member, an elongated metallic sleeve extending from the inner member in reverse overlapping relationship to said inner member to provide an elongated annular space between the sleeve and the inner member with a smooth rounded wall portion being disposed between the sleeve and inner member as the only physical contact between the inner member and sleeve, the outer tubular member being radially spaced from said sleeve and having a filleted curved inner surface approaching said sleeve and a second curved filleted inner surface overlying said sleeve to provide a shoulder in said outer member radially removed from said sleeve, corrosion resistant packing material disposed against said shoulder between the sleeve and outer member, a packing gland abutting said sealing means to hold the gland against said shoulder, a vitreous enamel coating extending continuously along the inner surface of the inner member and over the rounded wall portion and covering the outer surface of said sleeve, the end of said sleeve remote from the rounded wall portion being radially spaced from the inner member to provide an opening therebetween whereby gas liberated during fusing of the enamel to the inner member and sleeve may pass freely from the inner surface of the sleeve and the outer surface of the inner member to said annular space and escape through the opening between the sleeve and the inner member, and a vitreous enamel coating fused to the inner surface of the outer member including said first and second curved and filleted surfaces.

2. A corrosion resistant expansion joint for pipe lines and the like, comprising a pair of metallic tubes, each tube being open at both ends and the end of the inner tube being telescopically arranged within one end of the outer tube, an elongated metallic sleeve surrounding the telescoping end of the inner tube, with the inner diameter of said sleeve being greater than the outer diameter of the inner tube, weld means joining the inner end of said inner tube and sleeve with said weld means bridging the gap between the inner ends of the sleeve and inner tube to provide a fluid-tight joint therebetween and providing the only physical contact between the inner tube and sleeve, said weld means having a rounded outer surface to provide a smooth curved juncture between the inner tube and the outer surface of the sleeve, a vitreous enamel coating extending continuously along the inner surface of the inner tube and around the rounded outer surface of the weld means and covering the outer surface of said sleeve, the opposite end of said sleeve from said weld means being radially spaced from the inner tube whereby gas liberated during fusing of the enamel to the inner member and said sleeve may pass freely from the inner surface of the sleeve and the outer surface of the inner tube and escape through the space between the sleeve and inner tube, a curved filleted surface provided on the inside of said outer tube at the approach of the outer tube to said sleeve and a second curved filleted surface disposed in the outer tube at a portion of the tube over said sleeve to provide a shoulder in the said outer tube overlying said sleeve, a corrosion resistant packing material disposed between the sleeve and outer tube, a packing gland abutting said sealing means to hold the seal against said shoulder, and a vitreous enamel coating fused to the inner surface of the outer member including said first and second named curved filleted surfaces.

References Cited in the file of this patent

UNITED STATES PATENTS

| Number | Name | Date |
| --- | --- | --- |
| 827,383 | McElroy | July 31, 1906 |
| 1,367,349 | Barnes | Feb. 1, 1921 |
| 1,463,461 | Davis | July 31, 1923 |
| 1,707,904 | Dawson | Apr. 2, 1929 |
| 2,060,899 | Russell | Nov. 17, 1936 |
| 2,239,509 | Uecker | Apr. 22, 1941 |
| 2,266,610 | Martin | Dec. 16, 1941 |
| 2,520,501 | Guiler | Aug. 29, 1950 |